United States Patent
Johnson et al.

(10) Patent No.: US 9,559,926 B2
(45) Date of Patent: Jan. 31, 2017

(54) SELECTING FRAME LOSS MEASUREMENT

(71) Applicant: Adtran Inc., Huntsville, AL (US)

(72) Inventors: Milton Jay Johnson, Owens Cross Roads, AL (US); Andrew T. Ruble, Athens, AL (US)

(73) Assignee: Adtran Inc., Huntsville, AL (US)

( * ) Notice: Subject to any disclaimer, the term of this patent is extended or adjusted under 35 U.S.C. 154(b) by 71 days.

(21) Appl. No.: 14/705,051

(22) Filed: May 6, 2015

(65) Prior Publication Data
US 2016/0330096 A1    Nov. 10, 2016

(51) Int. Cl.
*G01R 31/08* (2006.01)
*H04L 12/26* (2006.01)
*H04L 12/24* (2006.01)

(52) U.S. Cl.
CPC ....... *H04L 43/0829* (2013.01); *H04L 41/0896* (2013.01); *H04L 43/16* (2013.01)

(58) Field of Classification Search
None
See application file for complete search history.

(56) References Cited

U.S. PATENT DOCUMENTS

| 2012/0236734 A1* | 9/2012 | Sampath | H04L 12/413 370/252 |
| 2013/0329579 A1* | 12/2013 | Missett | H04L 43/0835 370/252 |

* cited by examiner

*Primary Examiner* — Duc C Ho
(74) *Attorney, Agent, or Firm* — Fish & Richardson P.C.

(57) ABSTRACT

Methods, systems, and apparatus for selecting frame loss measures are disclosed. In one aspect, a Synthetic Loss Measurement (SLM) report for a given interval for a network managed entity that includes at least two network nodes is received. A Loss Measurement Message (LMM) report for a given interval for the network managed entity is received. For the given interval and from the SLM and LMM reports, a reporting measurement for the network managed entity is selected based, at least in part, on a frame rate of data transmitted over the network managed entity during the given interval or an occurrence of a specified network event during the given interval. Frame loss information for the given interval for the network managed entity based on the selected reporting measurement is reported.

21 Claims, 4 Drawing Sheets

SELECTING FRAME LOSS MEASUREMENT

BACKGROUND

This specification relates to selecting frame loss measurement.

In a telecommunication network, frame loss rates for network managed entities are monitored and reported for network maintenance and optimizations. A network managed entity represents a connection between network nodes (e.g., network communication devices). For example, a network managed entity can be a data circuit that connects two or more network nodes. In some cases, a network node can report frame loss rates for the network managed entities that are associated with the network node.

SUMMARY

In general, one innovative aspect of the subject matter described in this specification can be embodied in methods for selecting a frame loss measurement from among multiple available frame loss measurements. Methods can include receiving, for a given interval, a Synthetic Loss Measurement (SLM) report for a network managed entity that includes at least two network nodes; receiving, for the given interval, a Loss Measurement Message (LMM) report for the network managed entity; selecting, for the given interval and from the SLM and LMM reports, a reporting measurement for the network managed entity based, at least in part, on a frame rate of data transmitted over the network managed entity during the given interval or an occurrence of a specified network event during the given interval; and reporting, for the given interval, frame loss information for the network managed entity based on the selected reporting measurement.

These and other embodiments can each optionally include one or more of the following features. The reporting measurement can be selected based on the frame rate of data.

The reporting measurement can be selected further based on a predetermined measurement accuracy metric of the SLM message or a transmission rate of SLM messages. Methods can include determining a minimum number of SLM messages required to achieve the predetermined measurement accuracy metric; determining a number of transmitted SLM messages; and determining that the number of transmitted SLM messages is smaller than the minimum number of SLM messages required to achieve the predetermined measurement accuracy. Selecting a reporting measurement for the network managed entity can include, in response to determining that the number of transmitted SLM messages is smaller than the minimum number of SLM messages, not selecting the SLM report as the reporting measure.

The reporting measure can be selected based on the occurrence of a specified network event. The specified network event can include switching a primary network managed entity to a secondary network managed entity.

Methods can include determining that an SLM accuracy has met a required accuracy threshold; and determining, for the given interval, that an LMM accuracy is below the required accuracy threshold based on the frame rate of data transmitted over the network managed entity being less than a frame rate required for the LMM to provide the required accuracy threshold. Selecting a reporting measurement for the network managed entity can include, in response to the SLM accuracy having met the required accuracy and the LMM accuracy being below the required accuracy threshold, selecting the SLM report as the reporting measurement for the network managed entity for the given interval.

Particular embodiments of the subject matter described in this specification can be implemented so as to realize one or more of the following advantages. By configuring measurement reports generated based on different frame loss measurement methods and selection criteria used to select reporting measurements from the frame loss measurement reports, a network administrator can obtain more accurate frame loss information and, in turn, more accurate network availability information. In addition, by configuring the selection criteria to include different accuracy thresholds, the network administrator can customize the reporting measurements based on the various levels of data activities of a network managed entity. Furthermore, by configuring the selection criteria to include different network events, the network administrator can customize the reporting measurements based on the various configurations of the network. The subject matter described in this specification improves the ability to characterize a network environment and ensure that the network is operating within specified operating parameters. Thus, the subject matter of this specification improves at least network communication technologies and network diagnostic technologies.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

In some cases, a service level agreement can specify a required available time for a network managed entity in a telecommunication network. As used in this document, the available time is the time period when the network managed entity delivers or is capable to deliver user data frames with less than or equal to a specified frame loss rate. In order to determine whether the network managed entity is providing the required available time, frame loss information of network managed entities are monitored and reported to determine network availability. If the network managed entity has less than the specified frame loss rate over at least the required available time, the network managed entity is considered to be in compliance with the service level agreement (e.g., assuming that other terms of the service level agreement are also met).

In some cases, different measurement methods can be used to determine the frame loss rate of a network managed entity over a time interval. In one method, referred to as the Loss Measurement Messages (LMM) method throughout this document, user data frames transmitted over the network managed entities are counted to determine the frame loss rate. For example, in an LMM method, the number of the user data frames that are transmitted from a network node at one end of the network managed entity can be counted. The number of the user data frames that are received by the network node at the corresponding end of the same network managed entity can also be counted. The difference between the number of the transmitted and received user data frames can represent the number of lost user data frames. The frame loss rate can be calculated as the ratio of the number of the lost user data frames and the number of transmitted user data frames. A network node can be configured to generate an LMM report to report the frame loss rate over a network managed entity in an interval based on the LMM method.

In another method, referred to as the Synthetic Loss Measurement (SLM) method throughout this document, specific messages are used to determine the frame loss rate rather than using user data frames. For example, in an SLM method, a network node at one end of the network managed entity can periodically transmit SLM messages as a separate data flow relative to the user data frames. The SLM messages are specific messages used to estimate frame loss rate for the network managed entity. The network node at the corresponding end of the network managed entity can receive the transmitted SLM messages. The number of received and transmitted SLM messages can be used to determine the number of lost SLM messages and, in turn, the loss rate of the SLM messages. In an SLM method, the loss rate of the SLM messages can be used to approximate the frame loss rate of user data frames transmitted over the network managed entity. A network node can be configured to generate an SLM report to report the frame loss rate over a network managed entity in an interval based on the SLM method. In some cases, a network can use the SLM and/or the LMM methods that are specified in a standard, e.g., the International Telecommunication Union (ITU) Y.1731 standard. In some cases, a network can use the SLM and/or the LMM methods that are proprietary to the network. As used in this document, SLM and LMM respectively refer to any type of synthetic loss measurement and any type of measurement based on user data frames. That is, SLM can refer to any loss measurement method that relies on specific messages that are transmitted between nodes instead of relying on direct measurement of user data frame loss, while LMM can refer to any loss measurement method that directly measures user data frame loss.

In some cases, the LMM method can provide a more accurate measure of the frame loss rate than the SLM method, for example, when the data activity is high and a large amount of user data frames have been transmitted over the network managed entity in an interval. In these or other cases, the LMM method can provide a more accurate measure because the LMM method counts the actual frames that are lost over the network managed entity, while the SLM report provides an approximation. In some cases, e.g., when there is less than a specified amount or no data traffic over the network managed entity, the LMM method may be inaccurate. For example, the LMM method may indicate zero frame loss because no user frames have been transmitted. In these or other cases, the SLM method can provide a more accurate measure of the frame loss rate, assuming that a sufficient number of SLM messages have been transmitted between the nodes of the network managed entity, as discussed in more detail below.

As discussed in more detail with respect to FIGS. 1-4, in some cases, both the SLM and LMM reports can be received at a metric device. The metric device can select a reporting measure from the SLM and LMM reports and report the frame loss rate based on the selected reporting measure. In some cases, the selection of a reporting measure can be based on a frame rate of user data transmitted over the network managed entity. For example, the metric device can select the LMM report if the data frame rate is greater than or equal to a minimum frame rate required to achieve a specified accuracy threshold (e.g., as specified in the service level agreement).

Figure 1:
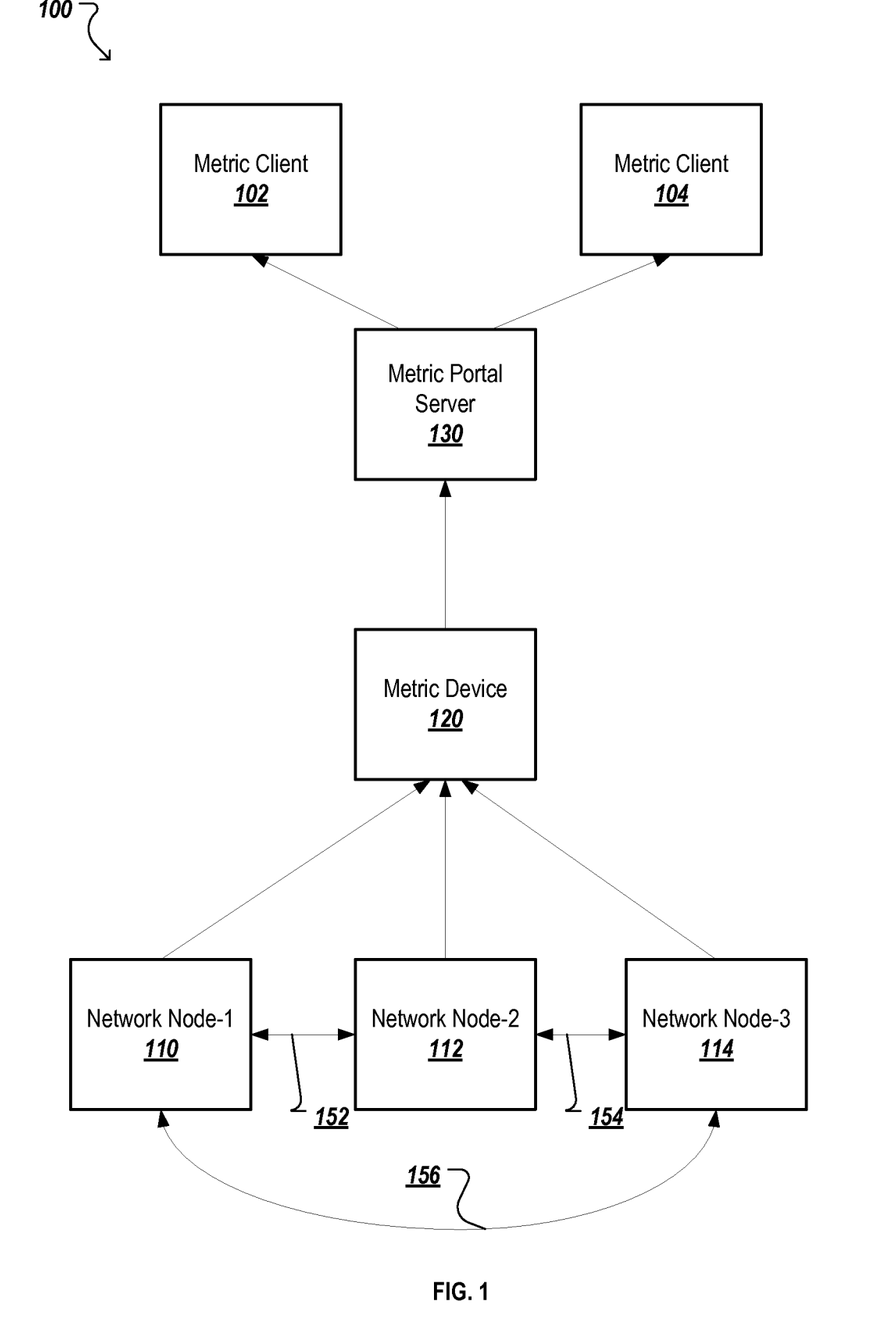
FIG. 1 is a block diagram of an example telecommunication network.

In some cases, the selection can be based on measurement accuracy metrics. The measurement accuracy metrics can be configured by a system administrator, and can include an SLM accuracy threshold and an LMM accuracy threshold. In these or other cases, the selection can be based on whether the LMM reports and/or the SLM reports meet their respective accuracy thresholds. For example, LMM reports can be used until a sufficient number of SLM messages have been transmitted over a network managed entity (e.g., enough messages to provide the specified level of accuracy). Once the sufficient number of SLM messages have been transmitted, the SLM report can be selected when the LMM accuracy falls below the specified level of accuracy (e.g., due to less than a specified amount of user data frames being transmitted over a given time interval). The selection of the LMM or SLM can be performed on a per-interval basis so that for each interval (e.g., period of time), the more accurate measurement is used as the reporting measure. Alternatively or additionally, the selection can be based on an occurrence of a specified network event. For example, LMM reports can be used for a primary network managed entity that operates in an active state and SLM reports can be used for a secondary network managed entity that operates in a standby state. When a switching event occurs, the secondary network managed entity can switch to an active state, and LMM reports can be used for the secondary network managed entity. The primary network managed entity can switch to a standby state, and SLM reports can be used for the primary network managed entity FIG. 1 is a block diagram of an example telecommunication network 100. The example telecommunication network 100 includes a metric portal server 130 that communicates with metric clients 102 and 104, and a metric device 120 that communicates with the metric portal server 130. The example telecommunication network 100 also includes network nodes 110, 112, and 114 that communicate with one another and with the metric device 120.

The metric clients 102 and 104 include any application, hardware, software, firmware, or combination thereof configured to access network operation information from the metric portal server 130. The network operation information can include frame loss information and/or network availability information for network managed entities in the example network 100. For example, the metric clients 102 and 104 can be computing devices of network administrators that access the network operation information to manage or optimize the example network 100.

The metric portal server 130 includes any application, hardware, software, firmware, or combination thereof configured to receive network operation reports from the metric device 120 and provide network operation information to the metric clients 102 and 104 based on the network operation reports. In some cases, the metric portal server 130 can provide a web portal (or another network portal) for the metric clients 102 and 104 to access the network operation information. In these or other cases, the metric clients 102 and 104 can log onto the metric portal server 130 using their preconfigured credentials and access the network operation information. In some cases, the metric portal server 130 can provide a Graphic User Interface (GUI). The GUI can display the network operation information (e.g., frame loss measurements as well as other network operation information) at the metric clients 102 and 104.

In some cases, the metric portal server 130 can parse the network operation information from the network operation reports that are transmitted by the metric device 120. In some cases, as discussed in more detail below, the network operation reports can include network availability information, frame loss information, or a combination thereof. In some cases, the network operation reports can be formatted according to standards, e.g., a Metro Ethernet Forum (MEF) 10.2 standard.

The telecommunication network 100 also includes the network node-1 110, the network node-2 112, and the network node-2 114. The network nodes 110, 112, and 114 can include any application, hardware, software, firmware, or combination thereof configured to create network managed entities, measures frame losses over network managed entities, and transmit measurement reports for the network managed entities. For example, as illustrated, the connection between the network node-1 110 and the network node-2 112 can be referred to as network managed entity 152. Similarly, the connection between the network node-2 112 and the network node-3 114 can be referred to as network managed entity 154, and the connection between the network node-1 110 and the network node-3 114 can be referred to as network managed entity 156.

In some cases, a network managed entity (e.g., the network managed entity 152, 154, or 156) can be a data circuit over which data is transmitted between the corresponding network nodes of the data circuit. The network managed entity can transmit data using Ethernet, Digital Subscriber Line (DSL), fiber optics, or any other wireline communication technologies. The network managed entity can also transmit data using wireless communication technologies, e.g., Wireless Local Area Network (WLAN), Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE-Advanced.

A network node (e.g., the network node 110, 112, or 114) can be configured to measure frame losses over a network managed entity that includes the network node. The network node can use the LMM method, the SLM method, or a combination thereof to measure frame loss. As discussed previously, in the LMM method, the frame loss rate is calculated based on the number of user data frames transmitted and received over a network managed entity in an interval.

In one example, the network node-1 110 can count the number of the user data frames transmitted from the network node-1 110 to the network node-2 112 over the network managed entity 152 during the interval. The network node-2 112 can count the number of user data frames received over the network managed entity 152 during the interval. In some cases, the network node-1 110 can transmit the count of transmitted user data frames to the network node-2 112. The network node-2 112 can calculate the number of lost data frames based on the difference between the number of the transmitted and received data frames, and calculate the frame loss rate based on the ratio of the number of the lost data frames and the transmitted data frames. Alternatively, the network node-2 112 can transmit the count of received user data frames to the network node-1 110, and the network node-1 110 can calculate the frame loss rate accordingly.

In some implementations, neither of the network nodes (e.g., 110 or 112) is required to calculate the frame loss rate, as the metric device 120 can calculate the frame loss rate based on information received from the network nodes. For example, the network node-1 110 can transmit the raw frame loss counts (e.g., the number of frames transmitted by the network node-1 110 and the number of frames received by the network node-2 112) to the metric device 120, and the metric device 120 can use the raw frame loss counts to calculate the frame loss rate.

The accuracy of the LMM methods can depend on the number of user data frames transmitted during the interval. As discussed in more detail with respect to FIGS. 2-4, a network administrator can configure an LMM accuracy threshold for the reporting of LMM measurements.

In some cases, a network node can be configured to use the SLM method to measure frame loss over a network managed entity that includes the network node. As discussed previously, in the SLM method, specific messages are transmitted and counted over a network managed entity during an interval to estimate frame loss rate. In one example, the network node-1 110 can transmit one SLM message or multiple SLM messages to the network node-2 112 over the network managed entity 152 during an interval. For each received SLM message, the network node-2 112 can transmit a Synthetic Loss Reply (SLR) message to the network node-1 110. Therefore, a reception of the SLR message by the network node-1 100 would indicate an instance of successful delivery, while failure of receiving the SLR message, due to either a loss of the SLM or the SLR message, would indicate an instance of data loss. The network node-1 110 can calculate the difference between the number of transmitted SLM messages and received SLR messages, and calculate a frame loss rate based on a ratio of the difference and the transmitted SLM messages.

In another example, the network node-1 110 can transmit the number of transmitted SLM messages to the network node-2 112, and the network node-2 112 can calculate the frame loss rates based on the number of transmitted and received SLM messages during an interval. In yet another example, the network node-2 112 can transmit the number of received SLM messages to the network node-1 110, and the network node-1 110 can calculate the frame loss rates based on the number of transmitted and received SLM messages during the interval. In some cases, the SLM and the SLR messages can be formatted in accordance to a standard, e.g., the International Telecommunication Union (ITU) Y.1731 standard. In some cases, the SLM and the SLR messages can be formatted in accordance to a proprietary protocol.

In some cases, a network administrator can configure a measurement interval for the LMM and/or the SLM measurement. A measurement interval can be configured in units of microseconds, seconds, minutes, hours, or any combination thereof.

Figure 2:
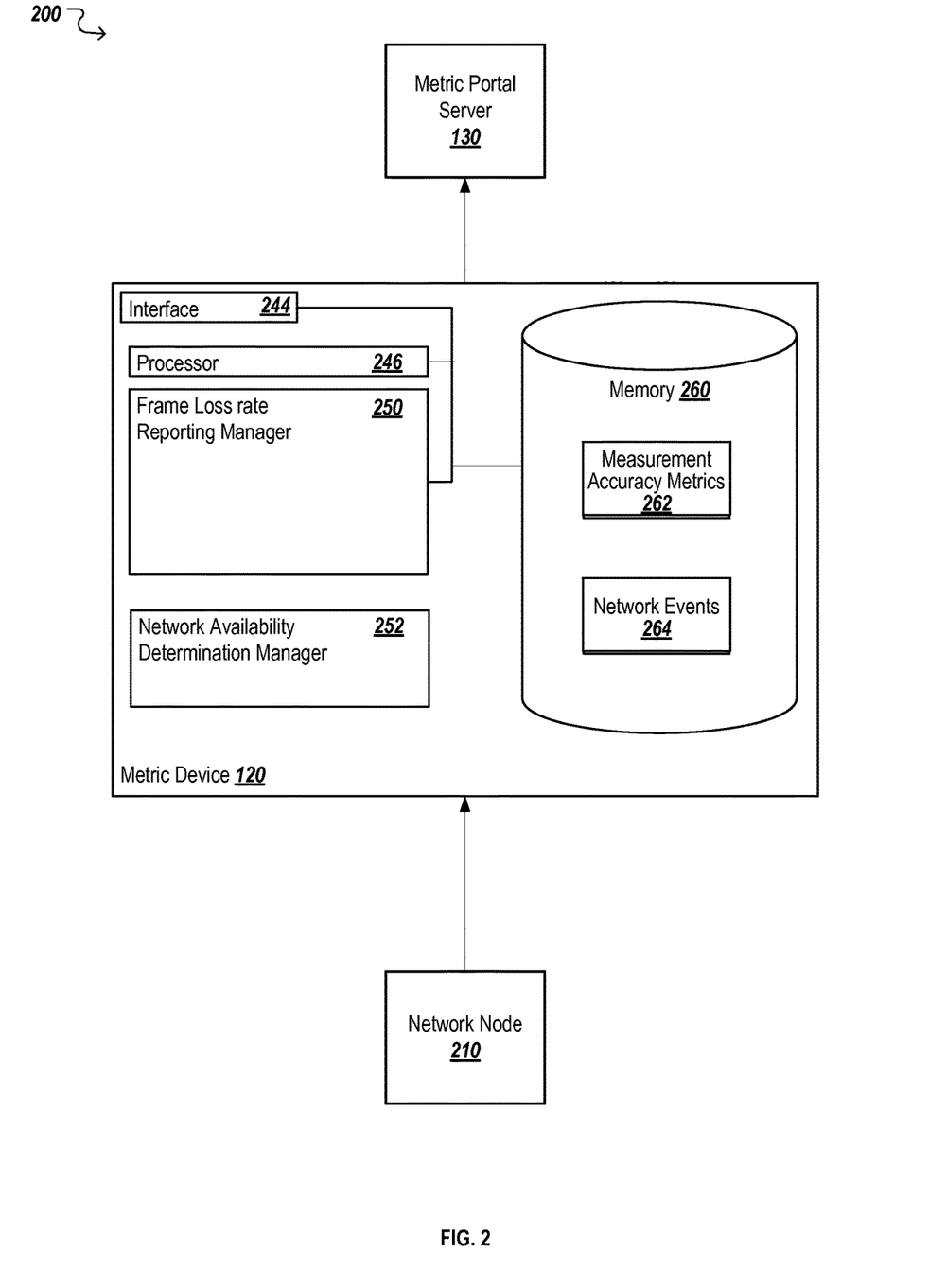
FIG. 2 is a block diagram of an example telecommunication network in which frame loss information is selected from among multiple available frame loss measurements.
Figure 3:
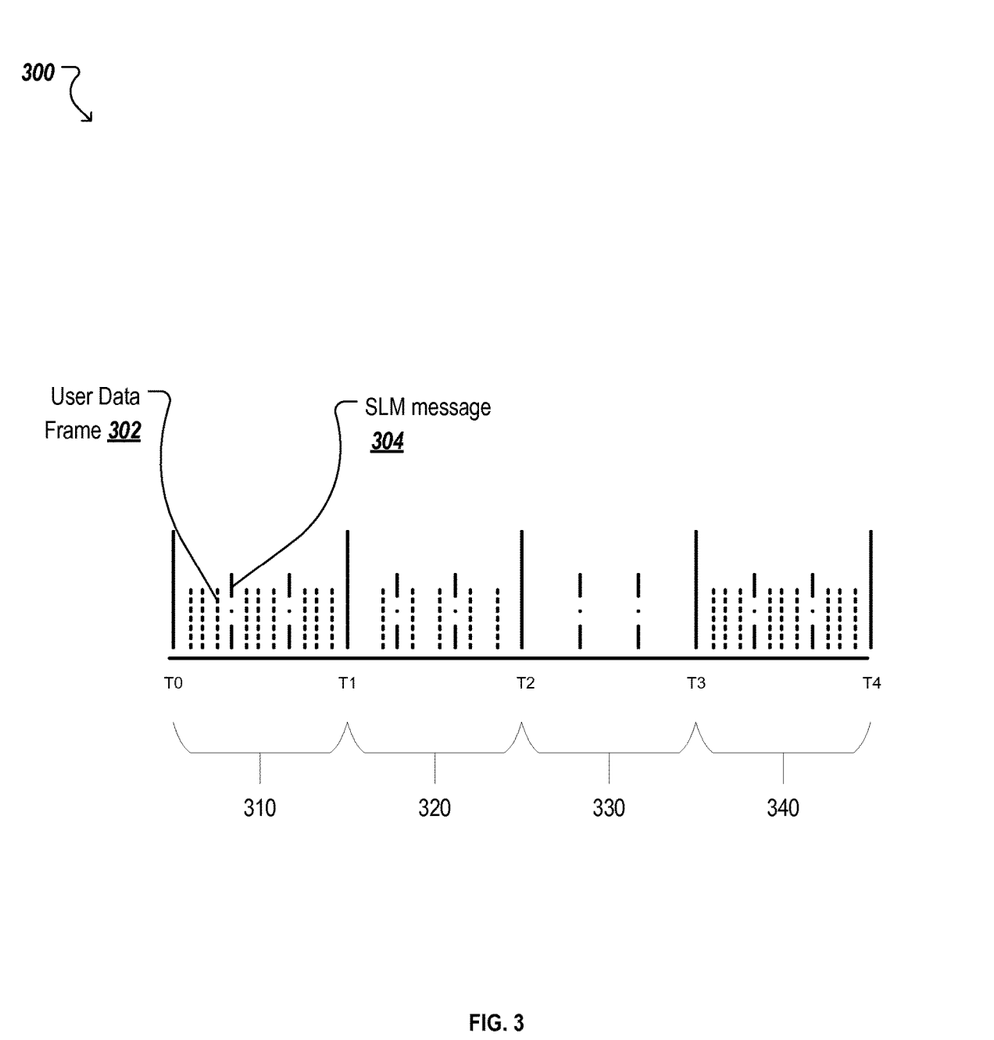
FIG. 3 is an illustration of an example data transmission timeline over a network managed entity.
Figure 4:
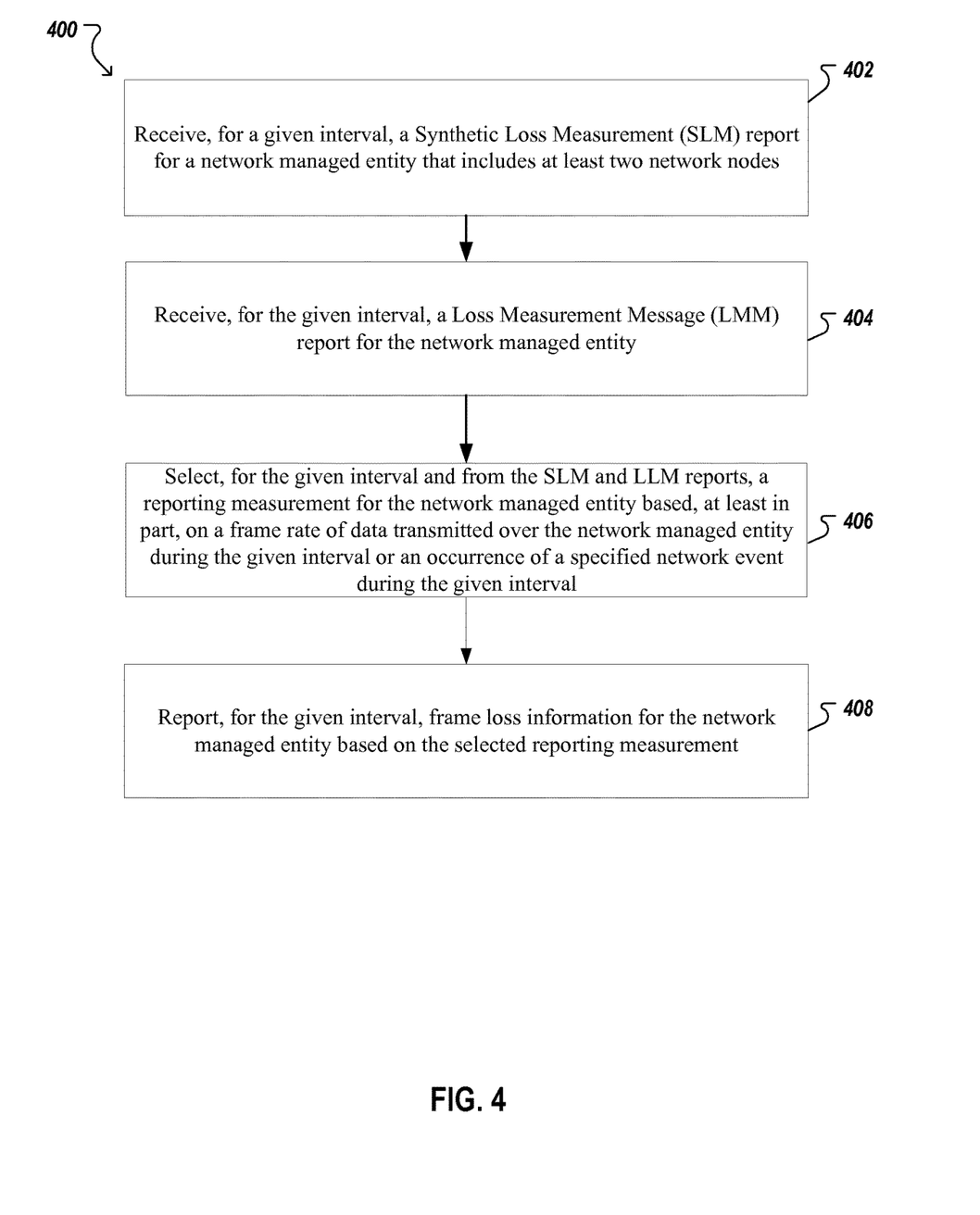
FIG. 4 is a flowchart of an example process for selecting frame loss measures.

As discussed in more detail with respect to FIGS. 2-4, the accuracy of the SLM methods can depend on the number of SLM messages transmitted. A network administrator can configure an SLM accuracy threshold for the reporting of SLM measurements. In some cases, the SLM accuracy threshold can be configured in association with the number of SLM messages transmitted during a SLM accuracy interval. In some cases, the SLM accuracy interval can be include one or more measurement intervals.

A network node can transmit measurement reports for measured frame loss rates of associated network managed entity to the metric device 120. In one example, the network node-1 110 can transmit an LMM report to the metric device 120. The LMM report transmitted by the network node-1 110 can include a frame loss rate of any network managed entity (e.g., 152 and/or 156) that includes the network node-1 110. The LMM report can specify the frame loss for a given interval based on the LMM method. In some cases, the LMM report can indicate the number of user data frames that were transmitted, the number of user data frames that were successfully received, the number of user data frames that were not received, the frame loss rate for the given interval, or a combination thereof.

In another example, the network node-1 110 can also transmit an SLM report to the metric device 120 for the same interval. The SLM report can include information regarding frame loss of the network managed entity 152 and/or 156 for the given interval based on the SLM method. In some cases, the SLM report can include the number of transmitted SLM messages (e.g., transmitted prior to and/or during the given interval), the number of received SLM messages (e.g., prior to and/or during the given interval), the number of received SLR messages (e.g., prior to and/or during the given interval), the frame loss rate based on the SLM method for the interval, or a combination thereof.

In some cases, the SLM and the LMM reports can be formatted in accordance to a standard, e.g., the International Telecommunication Union (ITU) Y.1731 standard. In some cases, the SLM and the LMM reports can be formatted in accordance to a proprietary protocol. In some cases, the SLM and the LMM reports can include additional measurement information, e.g., delay measurement for data transmitted over a network managed entity and/or an overall network availability status for each interval (available or not available).

The metric device 120 can include any application, hardware, software, firmware, or combination thereof configured to select a reporting measurement based on measurement reports. As discussed in more detail with respect to FIGS. 2-4, the metric device 120 can receive measurement reports (e.g., SLM reports and/or LMM reports) of network managed entities from network nodes (e.g., the network nodes 110, 112, and 114), select the reporting measure from the received reports based on a frame rate of data transmitted over the network managed entity, SLM and/or LMM accuracy thresholds, an occurrence of a specified network event, or a combination thereof.

The metric device 120 can determine frame loss information based on the selected reporting measure. In some cases, the metric device 120 can determine the network availability information based on the frame loss information. In some cases, the metric device 120 can provide network operation reports to the metric portal server 130. The network operation reports can include network availability information, frame loss information, or a combination thereof.

FIG. 2 is a block diagram of an example telecommunication network 200 in which frame loss information is selected from among multiple available frame loss measurements. As illustrated, the example telecommunication network 200 includes a metric portal server 130 and a network node 210 that are communicatively coupled with the metric device 120.

As illustrated, the network 200 can include a network node 210. The network node 210 can include any application, hardware, software, firmware, or combination thereof configured to provide measurement reports for network managed entities in the example telecommunication network 200. As described previously, a network managed entity can be a connection between network nodes in the network. Also as described previously, the measurement reports can be SLM reports generated based on the SLM method, and/or the LMM reports generated based on the LMM method. In some cases, the network node 210 is configured to transmit both the LMM report and the SLM report for the same network managed entity and the same given interval to the metric device 120.

As illustrated, the network 200 includes the metric device 120. As discussed in more detail below, the metric device 120 receives the measurement reports, selects a reporting measurement based on the received measurement reports, and determines frame loss information based on the selected reporting measure. In some cases, the metric device 120 can determine the network availability information based on the frame loss information. In some cases, the metric device 120 can transmit the network availability information and/or the frame loss information to the metric portal server 130. As illustrated, the metric device 120 includes an interface 244, a processor 246, a frame loss rate reporting manager 250, a network availability determination manager 252, and a memory 260. Each of these elements will be discussed in turn below and can each include any application, hardware, software, firmware, or combination thereof configured to facilitate the operations and functionality discussed below.

The interface 244 is configured to provide communications between the metric device 120 and other components in the example telecommunication network 200. In some cases, the interface 244 can include software supporting one or more communication protocols associated with the communications in the illustrated network 200. Alternatively or in combination, the interface 244 can include hardware that is operable to communicate physical signals within and outside of the illustrated network 200.

As illustrated in FIG. 2, the metric device 120 includes a processor 246. Although illustrated as a single processor 246 in FIG. 2, two or more processors may be used according to particular needs, desires, or particular implementations of the network 200. Each processor 246 may be a central processing unit (CPU), an application specific integrated circuit (ASIC), a field-programmable gate array (FPGA), or another suitable component. The processor 246 can execute instructions and manipulate data to perform the operations of the metric device 120. For example, the processor 246 can execute the operations described in the illustrated figures, including the operations performing the functionality associated with the metric device 120, generally, as well as the various software modules, including the functionality for sending communications to and receiving transmissions from the frame loss rate reporting manager 250.

As illustrated in FIG. 2, the metric device 120 also includes a memory 260 that stores data for the metric device 120. Although illustrated as a single memory 260 in FIG. 2, two or more memories may be used according to particular needs, desires, or particular implementations of the metric device 120. While memory 260 is illustrated as an integral component of the metric device 120, in alternative implementations, memory 260 can be external to the metric device 120.

The memory 260 can store one or more measurement accuracy metrics 262. In some cases, as illustrated, the memory 260 can also store one or more network events 264. As discussed in more detail below, the frame loss rate reporting manager 250 can select the reporting measure based on the measurement accuracy metrics 262 and/or the network events 264. The measurement accuracy metrics 262 and the network events 264 can be configured by the network administrators to configure the selection of reporting measure.

In some cases, the network events 264 can include a specified network operation event of the network managed entity that is associated with the measurement reports. In some cases, the network managed entity can operate in a redundancy configuration, where the network managed entity can have both a primary and a secondary network managed entity. The primary network managed entity can operate in an active state, while the secondary network managed entity can operate in a standby state. In one example, the network events 264 can include a switching event of the network managed entity. In a switching event, the secondary network managed entity can switch to the active state and the primary network managed entity can switch to the standby state. As discussed in more detail below, in some cases, the frame loss rate reporting manager 250 can select the reporting measure based on the occurrence of network events such as a switching event.

In some cases, the measurement accuracy metrics 262 can include an SLM accuracy threshold, an LMM accuracy threshold, or a combination thereof. In some cases, an LMM accuracy threshold can specify a required (or suggested) data frame rate for data transmitted over the network managed entity. As discussed in more detail below, in these or other cases, the frame loss rate reporting manager 250 can select the reporting measure based on whether the required data frame rate for data transmitted over the network managed entity meets the specified data frame rate.

In one example, the SLM accuracy threshold can include a minimum number of transmitted SLM messages for a network managed entity. For example, if the frame loss measurement is required to provide $1*10^{-6}$ accuracy, then the minimum number of SLM transmitted messages could be set to $1*10^6$ transmitted messages. In another example, if the frame loss measurement is required to be accurate within 0.1%, then the minimum number of transmitted messages could be set to a number of transmitted messages that will provide the required accuracy.

In some cases, the SLM accuracy threshold can be based on standard deviation information, which can be used to determine the minimum number of transmitted SLM messages. For example, in an SLM method, each transmitted SLM message represents a sample over the data traffic over the network managed entity. A transmitted SLM message can be received or lost. Therefore, the measured number of lost SLM messages can be represented in a binomial distribution. The mean of the binomial distribution is the actual frame loss rate if the actual frame loss rate is constant during the interval. The standard deviation of the binomial distribution can be used to represent the accuracy of the SLM method. The following equation presents the standard deviation of the binomial distribution in percentage:

$$STD = \frac{\sqrt{(n \times p \times (1-p))}}{n},$$

where n represents the number of SLM messages in the interval, and p represents the actual frame loss rate.

Therefore, the number of transmitted SLM messages that corresponds to a given standard deviation can be determined based on the actual frame loss rate. The following table shows a set of numbers of transmitted SLM messages corresponding to different standard deviations for different actual frame loss rate.

TABLE 1

| Standard deviation of the binomial function | | |
|---|---|---|
| Actual Frame Loss Rate | Transmitted SLM Messages | Standard Deviation |
| 10% | 10 | 9.49% |
| 10% | 100 | 3.00% |
| 10% | 1000 | 0.95% |
| 1% | 10 | 3.15% |
| 1% | 100 | 0.99% |
| 1% | 1000 | 0.31% |
| 0.1% | 10 | 1.00% |
| 0.1% | 100 | 0.31% |
| 0.1% | 1000 | 0.1% |

As discussed above, the standard deviation can represent the accuracy level of the SLM method. Therefore, the frame loss rate reporting manager 250 can use the frame loss rate, and the SLM accuracy threshold to determine the minimum number of transmitted SLM messages required. For example, as shown in Table 1, if the SLM accuracy threshold is 1%, the actual frame loss rate is 1%, then the minimum number of transmitted SLM messages to achieve the accuracy threshold is 100. If the actual frame loss rate is 0.1% and the SLM accuracy threshold is 1%, then the minimum number of transmitted SLM messages to achieve the accuracy threshold is 10. In some cases, while the actual frame loss rate is unknown to the frame loss rate reporting manager 250, the frame loss rate reporting manager 250 can use the frame loss rate included in the SLM report as an approximation of the actual frame loss rate. Alternatively or additionally, the frame loss rate reporting manager 250 can use a specified minimum frame loss rate in a service level agreement as an approximation of the actual frame loss rate for purposes of selecting the minimum number of transmitted SLM messages.

In some cases, a network administrator can configure the SLM accuracy threshold for an SLM accuracy interval. In these or other cases, the SLM accuracy threshold is met if the number of transmitted SLM messages during the SLM accuracy interval is equal to or greater than the minimum number of transmitted SLM messages to achieve the accuracy threshold as discussed above. In one example, the SLM accuracy interval can include one measurement interval. In some cases, the SLM accuracy interval can include multiple measurement intervals, terminating at the end of the most recent measurement interval. In these or other cases, a network administrator can configure a longer SLM accuracy interval, and therefore, reduce the number of SLM messages required to transmit over the network managed entity to achieve the SLM accuracy threshold.

The frame loss rate reporting manager 250 can be configured to select reporting measures and report frame loss information based on the selected measures. In some cases, the frame loss rate determination manager 250 can select the reporting measures from the SLM report or the LMM report based on the measurement accuracy metrics 262. In some cases, as discussed above, the measurement accuracy metrics 262 can include an SLM accuracy threshold, and the frame loss rate reporting manager 250 can determine a minimum number of SLM messages required based on the SLM accuracy threshold.

In some cases, the frame loss rate reporting manager 250 can determine a number of SLM messages that have been transmitted for the network managed entity prior to and/or during the measurement interval. In one example, the number of SLM messages transmitted prior to and/or during the interval is included in the SLM report received by the metric device 120. The frame loss rate reporting manager 250 can compare the number of SLM messages transmitted prior to and/or during the interval with the minimum number of SLM messages required to achieve the SLM accuracy threshold. If the number of SLM messages transmitted is smaller than the minimum number of SLM messages required to achieve the SLM accuracy threshold, the frame loss rate determination manager 250 can determine that the SLM report has not met the required SLM accuracy. In these or other cases, the frame loss rate reporting manager 250 can determine not to select the SLM report as the reporting measure.

In some cases, the measurement accuracy metrics 262 can include an LMM accuracy threshold. As discussed previously, the LMM accuracy threshold can be used by the frame loss rate reporting manager 250 to determine the minimum frame data rate transmitted over the network managed entity over the measurement interval. In some cases, the frame loss rate reporting manager 250 can determine the frame data rate for data transmitted over the network managed entity based on the LMM reports. For example, the LMM report can include the number of user data frames transmitted during the measurement interval. The frame loss rate reporting manager 250 can calculate the frame data rate by dividing the number of user data frames transmitted over the length of the measurement interval. In these or other cases, the frame loss rate reporting manager 250 can determine whether the frame data rate for the measurement interval meets the minimum frame data rate. If the frame data rate transmitted during the measurement interval is greater or equal to the minimum frame data rate, the frame loss rate reporting manager 250 can determine that the LMM report has met the LMM accuracy threshold and select the LMM report as the basis of the frame loss measurement of the network managed entity. If the frame data rate transmitted during the measurement interval is smaller than the minimum frame data rate, the frame loss rate reporting manager 250 can determine that the LMM report has not met the LMM accuracy threshold and not select the LMM report.

In some cases, if the SLM report has met the required SLM accuracy threshold and the LMM report has not met the required LMM accuracy threshold, the frame loss rate reporting manager 250 can select the SLM report as the reporting measure.

FIG. 3 is an illustration of an example data transmission timeline 300 over a network managed entity. During the example timeline 300, user data frames 302 and SLM messages 304 are transmitted over four measurement intervals: 310, 320, 330, and 340. In the illustrated example, SLM messages are periodically transmitted, and there are 3 SLM messages transmitted in each measurement interval. In the illustrated example, the SLM accuracy threshold has been met for each interval. In the measurement interval 310 that begins at T0 and ends at T1, the data activity is high, and there are 9 user data frames transmitted during the interval. The frame loss rate reporting manager 250 can determine that the LMM report has met the LMM accuracy threshold, and selects the LMM report as the reporting measure. During the measurement interval 320 that begins at T1 and ends at T2, the data activity is reduced relative to interval 310. The frame loss rate reporting manager 250 can determine that the LMM accuracy threshold is no longer met because the frame data rate is too low, and therefore, selects the SLM report as the reporting measure. During the measurement interval 330 that begins at T2 and ends at T3, no user data frame is transmitted. The frame loss rate reporting manager 250 can determine that LMM accuracy threshold is not met and selects the SLM report as the reporting measure. During the measurement interval 330 that begins at T3 and ends at T4, the data activity resumes at high level, and the frame loss rate reporting manager 250 can, therefore, select the LMM report as the reporting measure.

Referring to FIG. 2, in some cases, if both the SLM and LMM reports have met their respective accuracy thresholds, the frame loss rate reporting manager 250 can select the LMM report as the reporting measure. In some cases, the frame loss rate reporting manager 250 can further compare the accuracy levels of the SLM and LMM reports and select the reporting measure according to which report has a higher determined accuracy (e.g., based on data frame rate and number of previously transmitted SLM messages). For example, a network administrator can configure a specified margin. If the number of the transmitted SLM messages exceeds the required minimum number of SLM messages by the specified margin, while the number of the transmitted frame data rate does not exceed the required minimum number of frame data rate by the specified margin, the frame loss rate reporting manager 250 can select the SLM report as the reporting measure. In some cases, the network administrator can configure different margins for the SLM report and the LMM report.

In some cases, the frame loss rate reporting manager 250 can select the reporting measure based on the occurrence of network events. For example, the metric device 120 can receive LMM reports and SLM reports for both the primary network managed entity and the secondary network managed entity of a redundant pair. The primary network managed entity operates in the active state, and the secondary network managed entity operates in the standby state. In this or other example, the user data frames are transmitted over the primary network managed entity and therefore the LMM reports can provide a more accurate reporting measure (assuming a sufficient amount of user data frames are being transmitted). In contrast, the SLM reports can provide a more accurate reporting measure because there is no data activity over the secondary network managed entity because the SLM messages can be transmitted over the secondary network managed entity irrespective of whether there is other data activity over the secondary network managed entity. Therefore, the frame loss rate reporting manager 250 can be configured to select the LMM report for the primary network managed entity, and the SLM report for the secondary network managed entity. In some cases, the network events 264 can include a switching event of the network managed entity. When a switching event occurs, the primary network managed entity can switch to the standby state and the secondary network managed entity can switch to the active state. Accordingly, the frame loss rate reporting manager 250 can switch the selection of reporting measures. The frame loss rate reporting manager 250 can select the LMM report for the secondary network managed entity and the SLM report for the primary network managed entity. This approach enables the network administrator to receive accurate measurements on the active entity while monitoring the standby entity.

In some cases, the frame loss rate reporting manager 250 can report the frame loss information that is included in the selected reporting measure, e.g., the SLM report or the LMM report. The frame loss information can include the frame loss rates. The frame loss information can also include the measurement interval of the reports. In some cases, the frame loss rate reporting manager 250 can report the frame loss information to other modules in the metric device 120, e.g., the network availability determination manager 252. Alternatively or additionally, the frame loss rate reporting manager 250 can report the frame loss information to other devices in the network 200, e.g., to the metric portal server 130.

The network availability determination manager 252 can be configured to determine network availability based on the frame loss information reported by the frame loss rate reporting manager 250. In some cases, the network availability determination manager 252 can calculate the network availability by comparing the frame loss rate of a network managed entity for an interval with the minimum frame loss rate specified in a service level agreement. For example, if the frame loss rate for a network managed entity is reported to be below the specified minimum frame loss rate, the network availability determination manager 252 can determine that the network managed entity is not available for the interval. If the frame loss rate for a network managed entity is reported to meet (e.g., be equal to or above) the specified minimum frame loss rate, the network availability determination manager 252 can determine that the network managed entity is available for the interval.

In some cases, the network availability determination manager 252 can aggregate multiple frame loss information in determining network availability. For example, if the reported frame loss rate for a network managed entity is above the specified minimum frame loss rate for consecutive intervals, the network availability determination manager 252 can determine that the network managed entity is available for the combined time through these intervals. In another example, if the reported frame loss rates for multiple network managed entities are above the specified minimum frame loss rate for the same interval, the network availability determination manager 252 can determine that an aggregated network managed entity that combines these network managed entities is available for the interval. In some cases, the network availability determination manager 252 can report the network availability information to other devices in the network 200, e.g., to the metric portal server 130.

FIG. 4 is a flowchart of an example process 400 for selecting frame loss measures. The example process 400 can be performed, for example, by one or more devices such as those described with reference to FIGS. 1-3. The example process 400 can also be implemented as instructions stored on a non-transitory, computer-readable medium that, when executed by one or more devices, configures the one or more devices to perform and/or cause the one or more devices to perform the operations of the example process 400.

A Synthetic Loss Measurement (SLM) report for a network managed entity is received (402). The SLM report includes SLM message loss information for a given interval. The network managed entity includes at least two network nodes.

A Loss Measurement Message (LMM) report for the network managed entity is received (404). The LMM report includes user data frame loss information for a given interval for the network managed entity.

A reporting measure for the given interval is selected from the SLM and LMM reports (406). The reporting measure is selected based, at least in part, on a frame rate of data transmitted over the network managed entity during the given interval or an occurrence of a specified network event during the given interval. In some cases, the reporting measurement is selected based on the frame rate of data. In some cases, as discussed above with reference to FIGS. 1-3, the reporting measurement is selected further based on a predetermined measurement accuracy metric of the SLM message or a transmission rate of SLM messages in the given interval. In some cases, a minimum number of SLM messages required to achieve the predetermined measurement accuracy metric is determined. A number of transmitted SLM messages is also determined. If the number of transmitted SLM messages is determined to be smaller than the minimum number of SLM messages required to achieve the predetermined measurement accuracy, the SLM report is not selected as the reporting measure. In some cases, as discussed above with reference to FIGS. 1-3, an SLM accuracy is determined to have met a required accuracy threshold, and an LMM accuracy is determined to be below the required accuracy threshold based on the frame rate of data transmitted over the network managed entity being less than a frame rate required for the LMM to provide the required accuracy threshold. In these or other cases, the SLM report is selected as the reporting measurement for the network managed entity for the given interval.

In some cases, as discussed above with reference to FIGS. 1-3, the reporting measure is selected based on the occurrence of a specified network event. In some cases, the specified network event includes switching a primary network managed entity to a secondary network managed entity.

After the reporting measure is selected, frame loss information for the network managed entity for the given interval is reported based on the selected reporting measurement (408).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination or in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:
1. A method, comprising:
receiving, for a given interval, a Synthetic Loss Measurement (SLM) report for a network managed entity that includes at least two network nodes;
receiving, for the given interval, a Loss Measurement Message (LMM) report for the network managed entity;

selecting, for the given interval and from the SLM and LMM reports, a reporting measurement for the network managed entity based, at least in part, on a frame rate of data transmitted over the network managed entity during the given interval or an occurrence of a specified network event during the given interval; and reporting, for the given interval, frame loss information for the network managed entity based on the selected reporting measurement.

2. The method of claim 1, wherein the reporting measurement is selected based on the frame rate of data.

3. The method of claim 1, wherein the reporting measurement is selected further based on a predetermined measurement accuracy metric of the SLM message or a transmission rate of SLM messages.

4. The method of claim 3, further comprising:
determining a minimum number of SLM messages required to achieve the predetermined measurement accuracy metric;
determining a number of transmitted SLM messages; and
determining that the number of transmitted SLM messages is smaller than the minimum number of SLM messages required to achieve the predetermined measurement accuracy, wherein selecting a reporting measurement for the network managed entity comprises:
in response to determining that the number of transmitted SLM messages is smaller than the minimum number of SLM messages, not selecting the SLM report as the reporting measure.

5. The method of claim 1, wherein the reporting measure is selected based on the occurrence of a specified network event.

6. The method of claim 5, wherein the specified network event comprises switching a primary network managed entity to a secondary network managed entity.

7. The method of claim 1, further comprising:
determining that an SLM accuracy has met a required accuracy threshold; and
determining, for the given interval, that an LMM accuracy is below the required accuracy threshold based on the frame rate of data transmitted over the network managed entity being less than a frame rate required for the LMM to provide the required accuracy threshold, wherein selecting a reporting measurement for the network managed entity comprises:
in response to the SLM accuracy having met the required accuracy and the LMM accuracy being below the required accuracy threshold, selecting the SLM report as the reporting measurement for the network managed entity for the given interval.

8. A device, comprising:
a memory; and
at least one hardware processor interoperably coupled with the memory and configured to:
receive, for a given interval, a Synthetic Loss Measurement (SLM) report for a network managed entity that includes at least two network nodes;
receive, for the given interval, a Loss Measurement Message (LMM) report for the network managed entity;
select, for the given interval and from the SLM and LMM reports, a reporting measurement for the network managed entity based, at least in part, on a frame rate of data transmitted over the network managed entity during the given interval or an occurrence of a specified network event during the given interval; and
report, for the given interval, frame loss information for the network managed entity based on the selected reporting measurement.

9. The device of claim 8, wherein the reporting measurement is selected based on the frame rate of data.

10. The device of claim 8, wherein the reporting measurement is selected further based on a predetermined measurement accuracy metric of the SLM message or a transmission rate of SLM messages.

11. The device of claim 10, wherein the at least one hardware processor is further configured to:
determine a minimum number of SLM messages required to achieve the predetermined measurement accuracy metric;
determine a number of transmitted SLM messages; and
determine that the number of transmitted SLM messages is smaller than the minimum number of SLM messages required to achieve the predetermined measurement accuracy, wherein selecting a reporting measurement for the network managed entity comprises:
in response to determining that the number of transmitted SLM messages is smaller than the minimum number of SLM messages, not select the SLM report as the reporting measure.

12. The device of claim 8, wherein the reporting measure is selected based on the occurrence of a specified network event.

13. The device of claim 12, wherein the specified network event comprises switching a primary network managed entity to a secondary network managed entity.

14. The device of claim 8, wherein the at least one hardware processor is further configured to:
determine that an SLM accuracy has met a required accuracy threshold; and
determine, for the given interval, that an LMM accuracy is below the required accuracy threshold based on the frame rate of data transmitted over the network managed entity being less than a frame rate required for the LMM to provide the required accuracy threshold, wherein selecting a reporting measurement for the network managed entity comprises:
in response to the SLM accuracy having met the required accuracy and the LMM accuracy being below the required accuracy threshold, select the SLM report as the reporting measurement for the network managed entity for the given interval.

15. A non-transitory, computer-readable medium storing computer-readable instructions executable by a computer and configured to:
receive, for a given interval, a Synthetic Loss Measurement (SLM) report for a network managed entity that includes at least two network nodes;
receive, for the given interval, a Loss Measurement Message (LMM) report for the network managed entity;
select, for the given interval and from the SLM and LMM reports, a reporting measurement for the network managed entity based, at least in part, on a frame rate of data transmitted over the network managed entity during the given interval or an occurrence of a specified network event during the given interval; and
report, for the given interval, frame loss information for the network managed entity based on the selected reporting measurement.

16. The non-transitory, computer-readable medium of claim 15, wherein the reporting measurement is selected based on the frame rate of data.

17. The non-transitory, computer-readable medium of claim 15, wherein the reporting measurement is selected further based on a predetermined measurement accuracy metric of the SLM message or a transmission rate of SLM messages.

18. The non-transitory, computer-readable medium of claim 17, wherein the computer-readable instructions are further configured to:
determine a minimum number of SLM messages required to achieve the predetermined measurement accuracy metric;
determine a number of transmitted SLM messages; and
determine that the number of transmitted SLM messages is smaller than the minimum number of SLM messages required to achieve the predetermined measurement accuracy, wherein selecting a reporting measurement for the network managed entity comprises:
in response to determining that the number of transmitted SLM messages is smaller than the minimum number of SLM messages, not select the SLM report as the reporting measure.

19. The non-transitory, computer-readable medium of claim 15, wherein the reporting measure is selected based on the occurrence of a specified network event.

20. The non-transitory, computer-readable medium of claim 15, wherein the computer-readable instructions are further configured to:
determine that an SLM accuracy has met a required accuracy threshold; and
determine, for the given interval, that an LMM accuracy is below the required accuracy threshold based on the frame rate of data transmitted over the network managed entity being less than a frame rate required for the LMM to provide the required accuracy threshold, wherein selecting a reporting measurement for the network managed entity comprises:
in response to the SLM accuracy having met the required accuracy and the LMM accuracy being below the required accuracy threshold, select the SLM report as the reporting measurement for the network managed entity for the given interval.

21. A telecommunications device, comprising:
a telecommunications interface configured to transmit and receive data over a telecommunications network; and
hardware processing components interoperably coupled with the telecommunications interface and configured to:
receive, for a given interval, a Synthetic Loss Measurement (SLM) report for a network managed entity that includes at least two network nodes;
receive, for the given interval, a Loss Measurement Message (LMM) report for the network managed entity;
select, for the given interval and from the SLM and LMM reports, a reporting measurement for the network managed entity based, at least in part, on a frame rate of data transmitted over the network managed entity during the given interval or an occurrence of a specified network event during the given interval; and
generate, to the portal server, for the given interval, frame loss information for the network managed entity based on the selected reporting measurement.

* * * * *